July 18, 1939.  H. W. GOODALL  2,166,524

HOSE CLAMP

Filed Sept. 21, 1938

INVENTOR
Howard W. Goodall
BY
Augustus B. Stoughton
ATTORNEY.

WITNESS:

Patented July 18, 1939

2,166,524

UNITED STATES PATENT OFFICE 2,166,524

HOSE CLAMP

Howard W. Goodall, Aldan, Pa.

Application September 21, 1938, Serial No. 230,935
In Canada March 14, 1936

1 Claim. (Cl. 285—78)

Objects of the present invention are to provide a comparatively short hose clamp in two identical sections which will embrace substantially the entire cylindrical surface of the hose end and bind and seal it to the spud even along the meeting edges of the sections, thereby opposing leakage between the inner surface of the hose and the outer surface of the spud, additionally to provide for securely attaching the clamp to the end of a wire wound hose and to make the clamp mechanically strong and convenient in application.

Other objects of the invention will appear from the following description at the end of which the invention will be claimed.

Generally stated, the invention comprises two identical clamp sections each of the general form of a segment of a hollow cylinder of more than 180° in extent, each clamp section being internally semi-cylindrical and provided with outwardly flaring marginal extensions and with an end cavity and an end hook, said extensions being circumferentially recessed providing tongues and spaces of different lengths and adapted to interengage, perforated lugs arranged in circumferentially staggered relation and projecting outward from the exterior of each clamp section in parallel confronting relation when the sections are assembled, bolts for connecting the lugs, said lugs provided wtih stops for the bolt heads, the roots of the tongues being thickened adjacent their union with the lugs to re-enforce them, and the semi-cylindrical internal surfaces of the sections having a group of parallel ribs and a group of screw thread ribs.

The invention also comprises the improvements to be presently described and finally claimed.

In the following description reference will be made to the accompanying drawing forming part hereof and in which.

Figure 1:
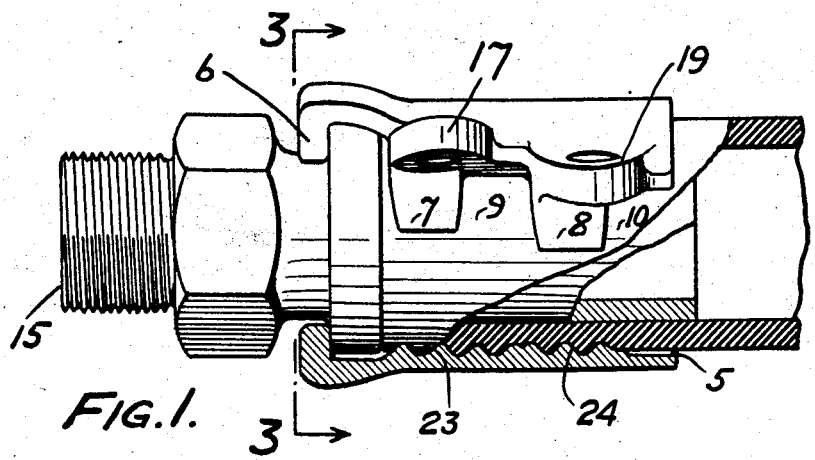
Figure 1 is a longitudinal elevation with parts broken away and in section with a hose clamp embodying features of the invention.
Figures 2, 4:
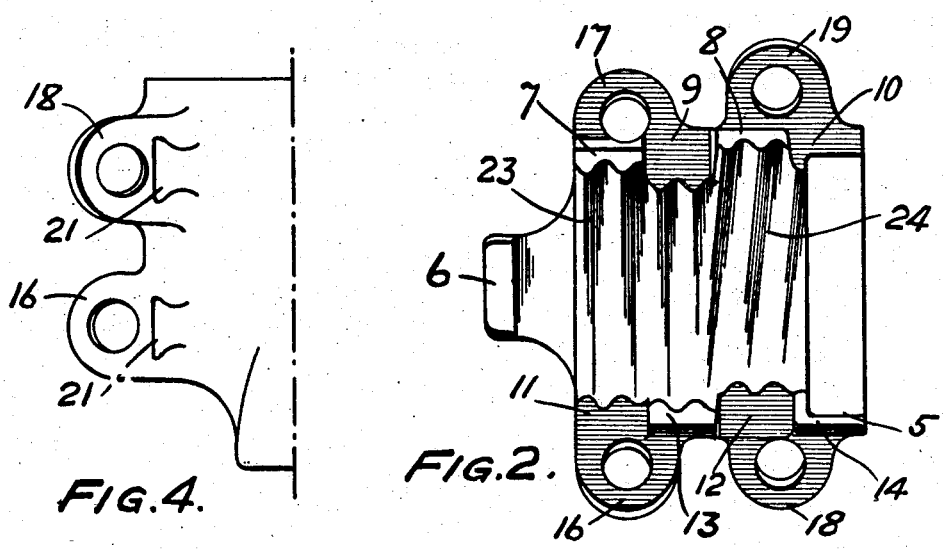
Figure 2 is a plan view of the inner surface of one of the clamp sections.
Figure 4 is a top or plan view of a half of one of the clamp sections.
Figures 3, 5:
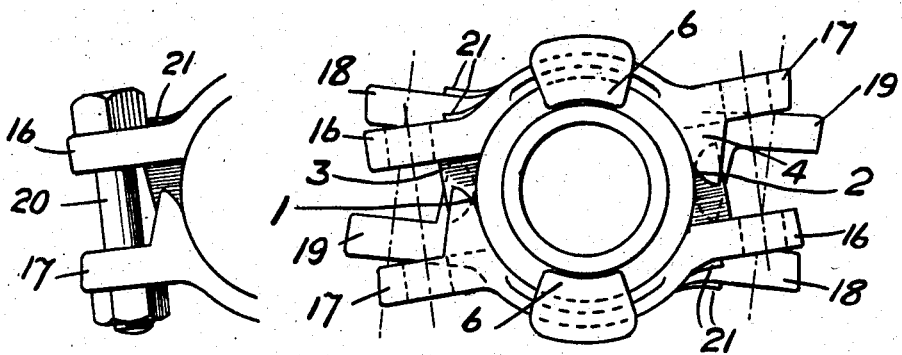
Figure 3 is a transverse sectional view taken on the line 3—3 of Figure 1.
Figure 5 is a detail view illustrating one pair of lugs and the bolt which connects them.

Referring to the drawing, the clamp sections are duplicate and therefore a detail description of one of them will suffice. The section is of the general form of a segment of a hollow cylinder of more than 180° in circular extent. Internally the section is semi-cylindrical between the points 1 and 2 (Figure 3), and the section is provided with outwardly flaring marginal extensions 3 and 4 and with an end cavity 5, and a hook 6. The marginal extensions are circumferentially recessed providing tongues 7 and 8 and spaces 9 and 10 of different circumferential lengths and adapted to interengage with similar spaces 11 and 12 and tongues 13 and 14 on the opposite marginal extension of a second clamp section. The result of this is that the joint between the two clamp sections lies along a line which is not straight, but which is first parallel with the axis, and then radial, and then parallel with the axis. However, the parts which are parallel with the axis do not lie in a straight line, but are disposed a few circular degrees from a straight line. The purpose of this is to ensure that the hose be clamped to the spud 15 well over its cylindrical surface and to avoid a straight line at the meeting edges of the clamp sections, which is not clamped to the spud. Again this circular displacement of the ends and roots of the successive projections gives the result in a single structure of two clamps applied side by side, but with their meeting edges arranged out of alignment. Along such a straight line leakage occurs, but the fact that the joint between the sections is along a broken line avoids leakage along that line. There are perforated lugs in circumferentially staggered relation and projecting outward from the exterior of the clamp section. In the assembled clamp the lugs are in parallel confronting relation. The lugs 16 and 17 are in confronting relation and the lugs 18 and 19 are in confronting relation (Figure 3), and the lugs 18 and 19 are circularly displaced in respect to the lugs 16 and 17 so that the clamping action is well distributed over the surface of the hose. 20 are bolts for connecting the lugs and they pass through perforations in the lugs and their axes or center line are shown by dash and dot lines in Figure 3. The lugs are provided with stops 21 (Figure 4) for engaging the bolt heads to prevent rotation of the bolts when the nuts are screwed onto the bolt ends. The roots of the tongues are thickened as at 22 adjacent their unions with the lugs to reenforce and strengthen them. The semi-cylindrical internal surface of the section is provided with a group of parallel ribs 23 and with a group of screw thread ribs 24. The screw thread ribs are intended for use with an externally wound wire hose which they firmly hold, and the parallel ribs are intended to engage the bare rubber surface of the hose from which a wire winding has been removed.

The spud 15 is inserted in the hose and the clamp sections, since they are but two in number, can be conveniently applied and bolted to place. The bolt head stops 21 facilitate this operation. The reenforcements 22 provide the necessary strength for causing the tongues to clamp the surface of the hose without bending or yielding. The zig-zag joint between the clamp margins ensures close sealing as has been mentioned. The fact that the bolts are not in alignment causes them to exert pressure upon the clamps at several points around the circumference of the coupling, and thus ensure good sealing pressure. The provision of the recess 5 avoids deformation of the hose wall at the end of the spud. The hooks C serve to secure the coupling to the spud.

I do not intend to be limited save as the scope of the prior art and of the attached claim may require.

I claim:

A hose clamp consisting of two identical one piece clamp sections each of the general form of a segment of a hollow cylinder of more than 180 circular degrees in extent, each clamp section being internally semicylindrical and provided with outwardly flaring marginal extensions, said extensions being circumferentially recessed providing tongues and spaces of different circumferential lengths and adapted to interengage, the ends and roots of successive tongues being circularly displaced to provide the effect in a single clamp structure of two clamp structures placed side by side with their meeting edges out of alignment, perforated lugs arranged in circumferentially staggered relation and projecting outward from the exterior of each clamp section in parallel confronting relation when the sections are assembled, and bolts for connecting the lugs.

HOWARD W. GOODALL.